Dec. 2, 1930.  W. L. MAJORS  1,783,576
HEATING APPARATUS
Filed Nov. 30, 1925  10 Sheets-Sheet 6
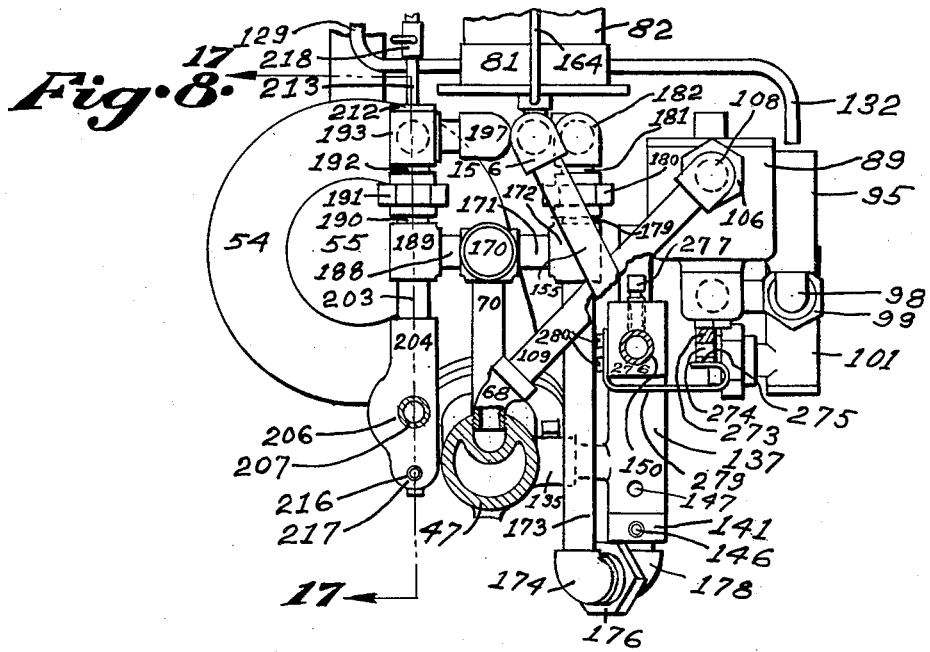
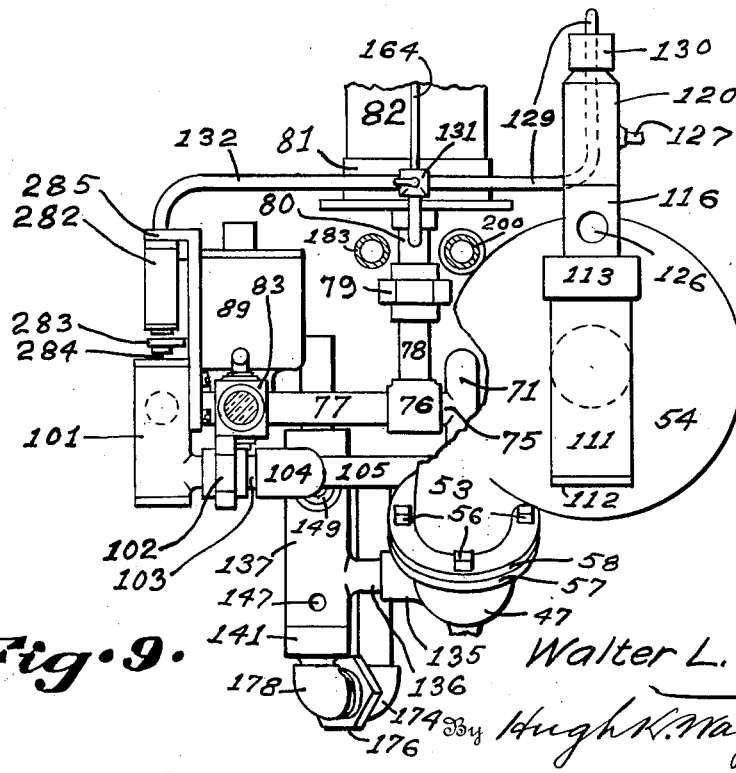

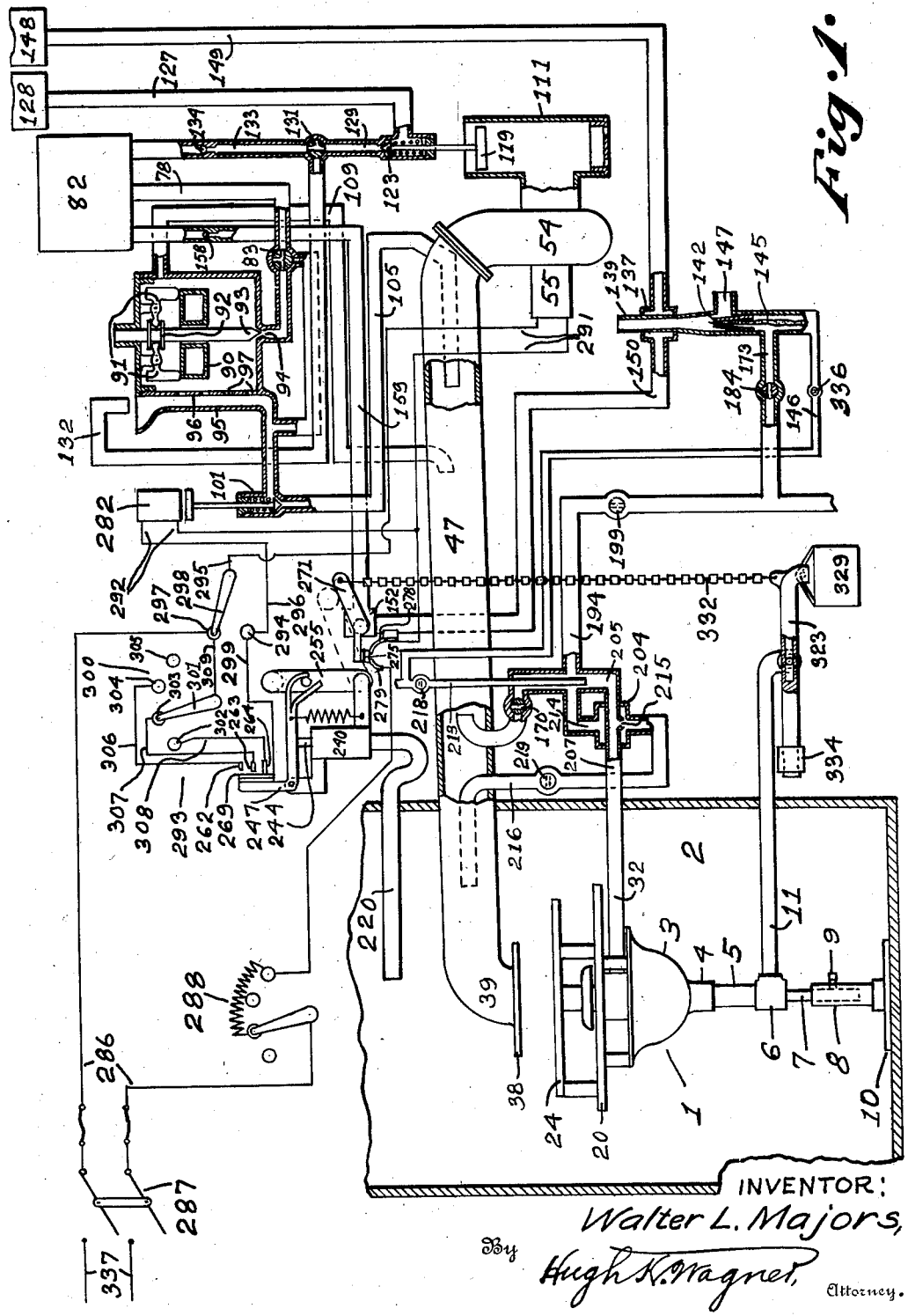

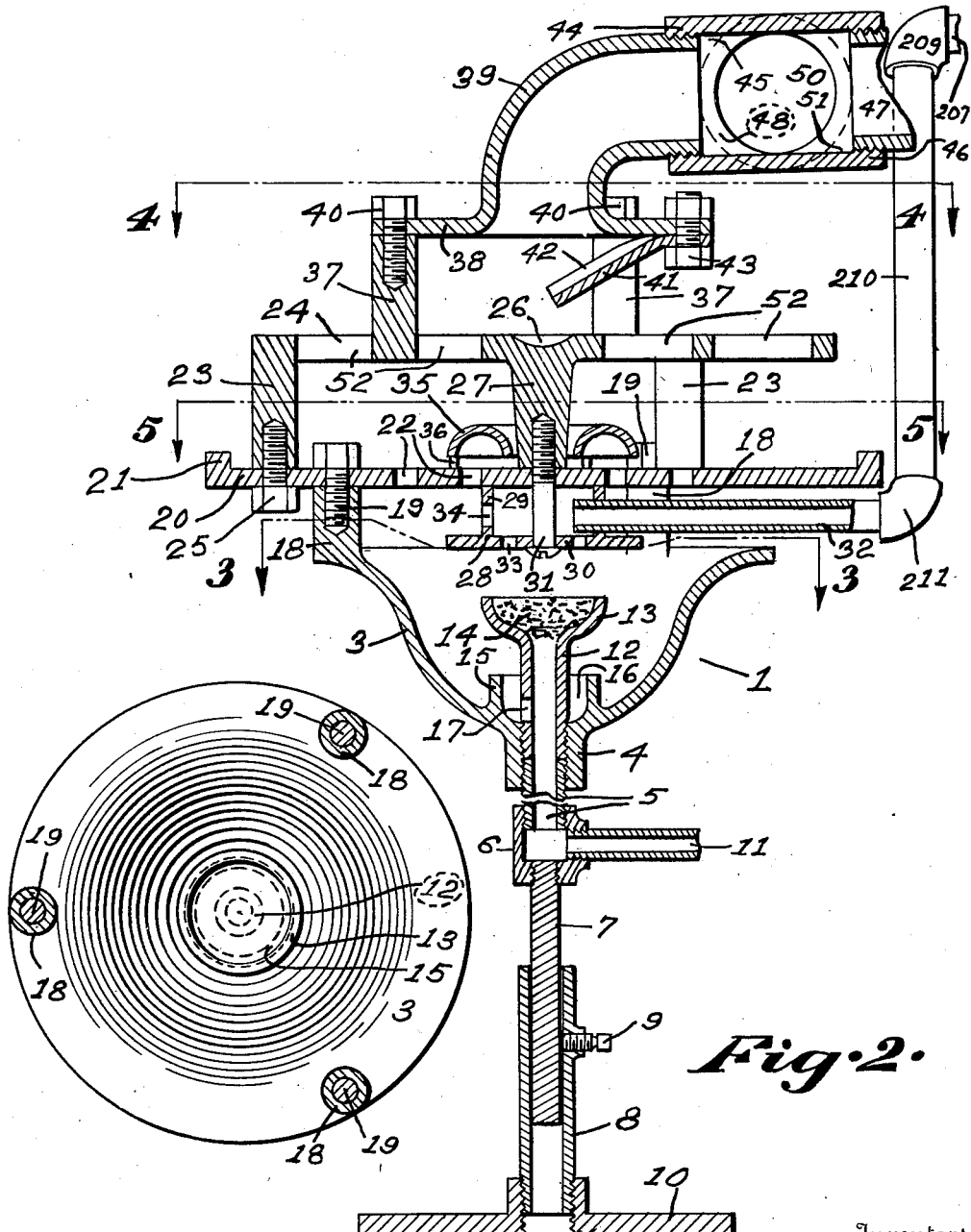

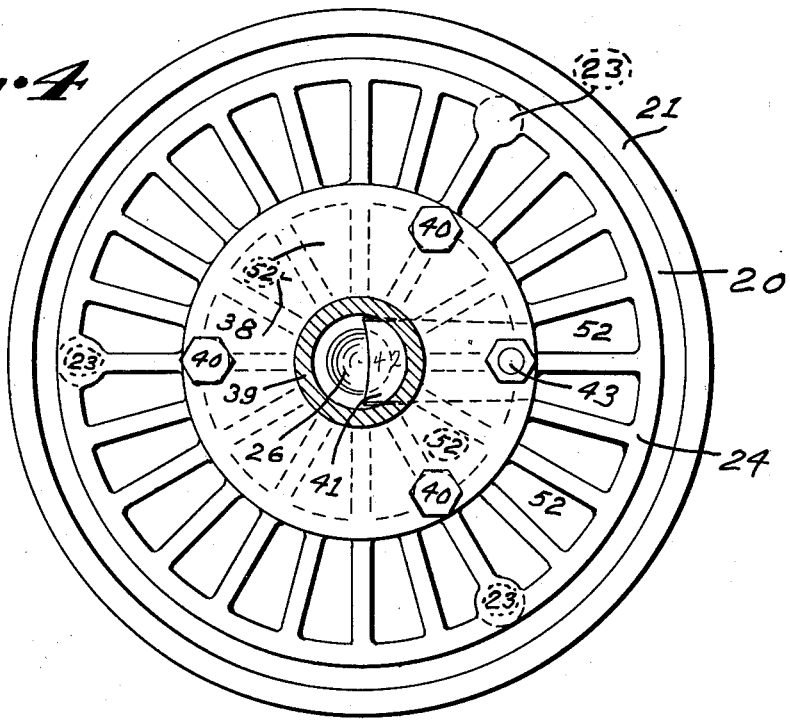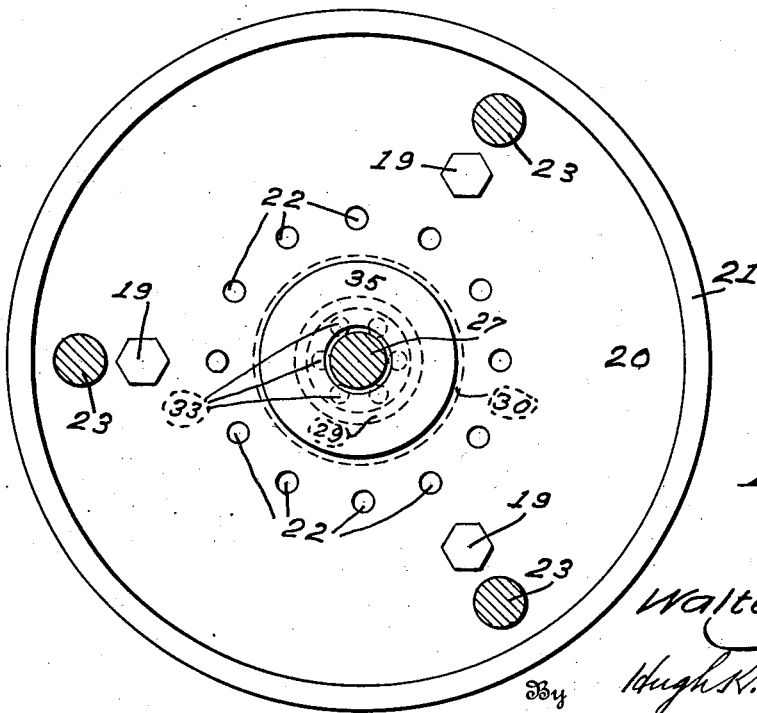

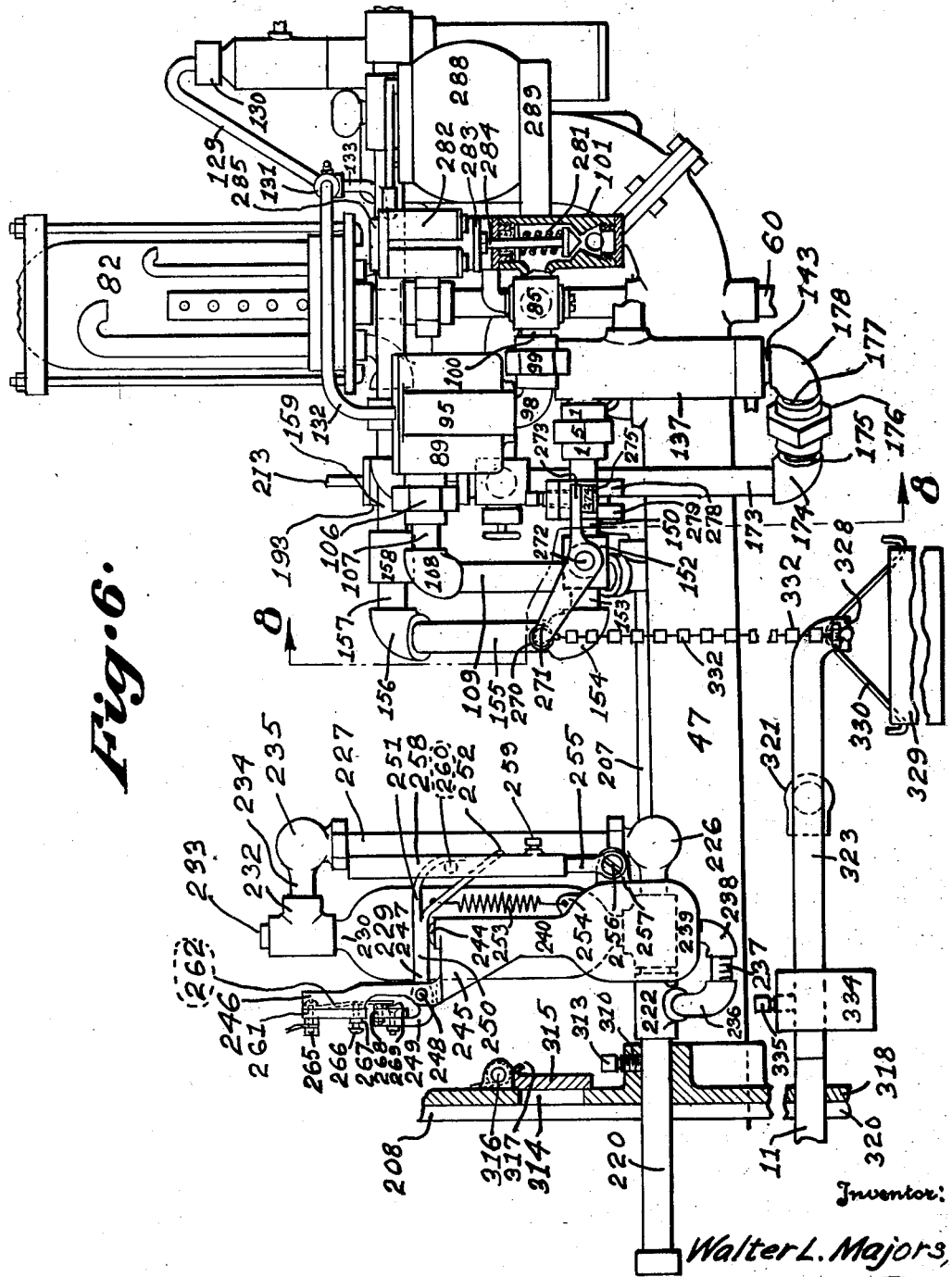

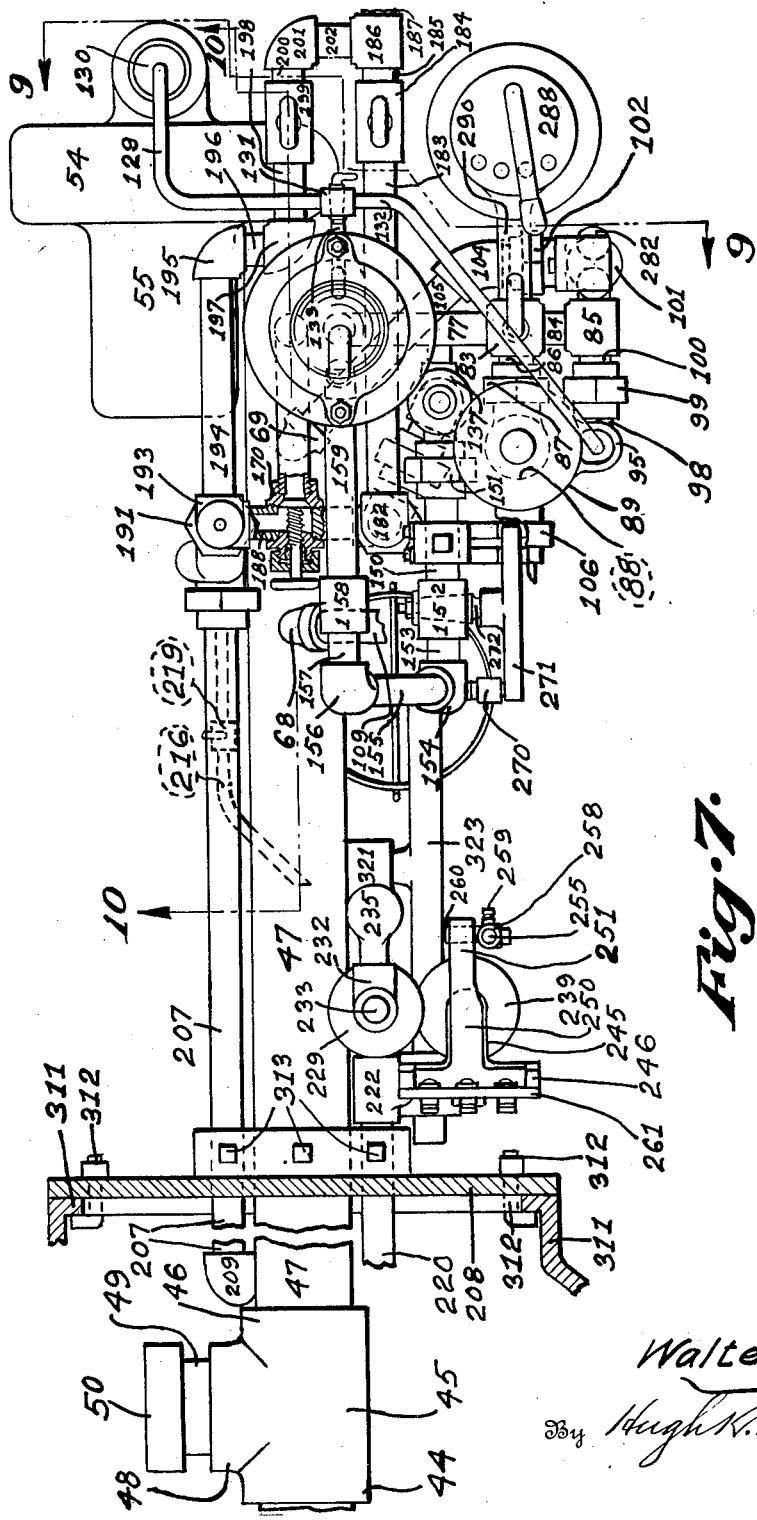

Dec. 2, 1930.　　W. L. MAJORS　　1,783,576
HEATING APPARATUS
Filed Nov. 30, 1925　　10 Sheets-Sheet 7

Inventor:
Walter L. Majors,
By Hugh K. Wagner
Attorney.

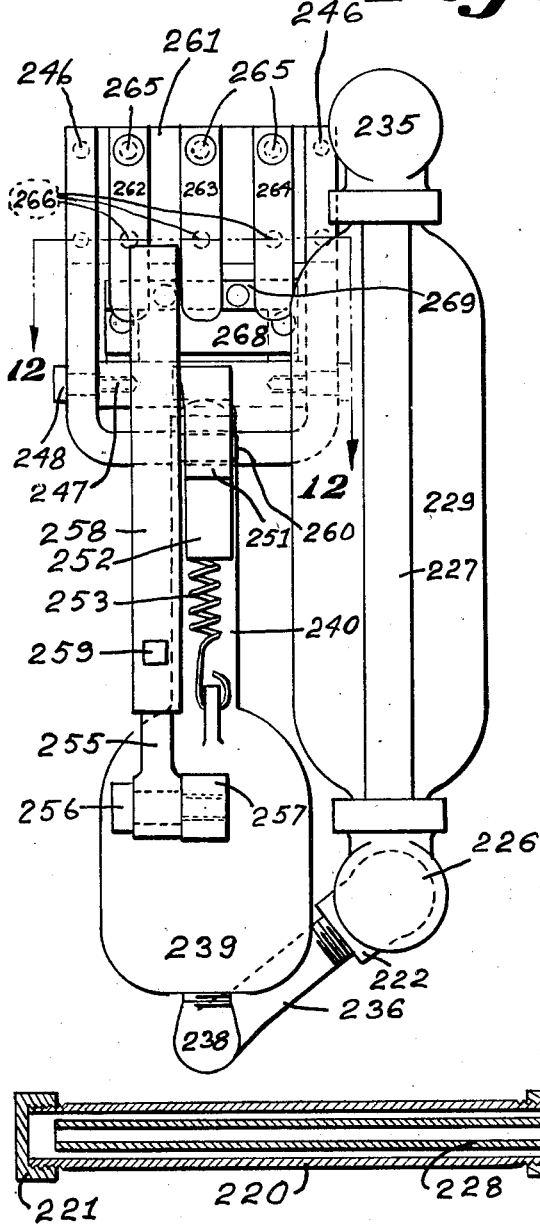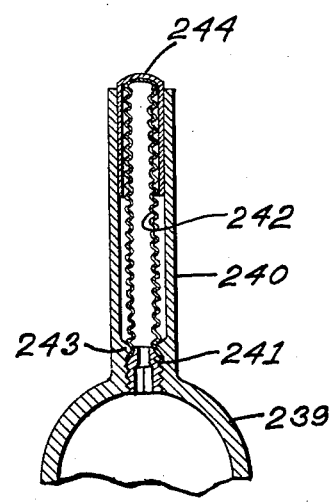

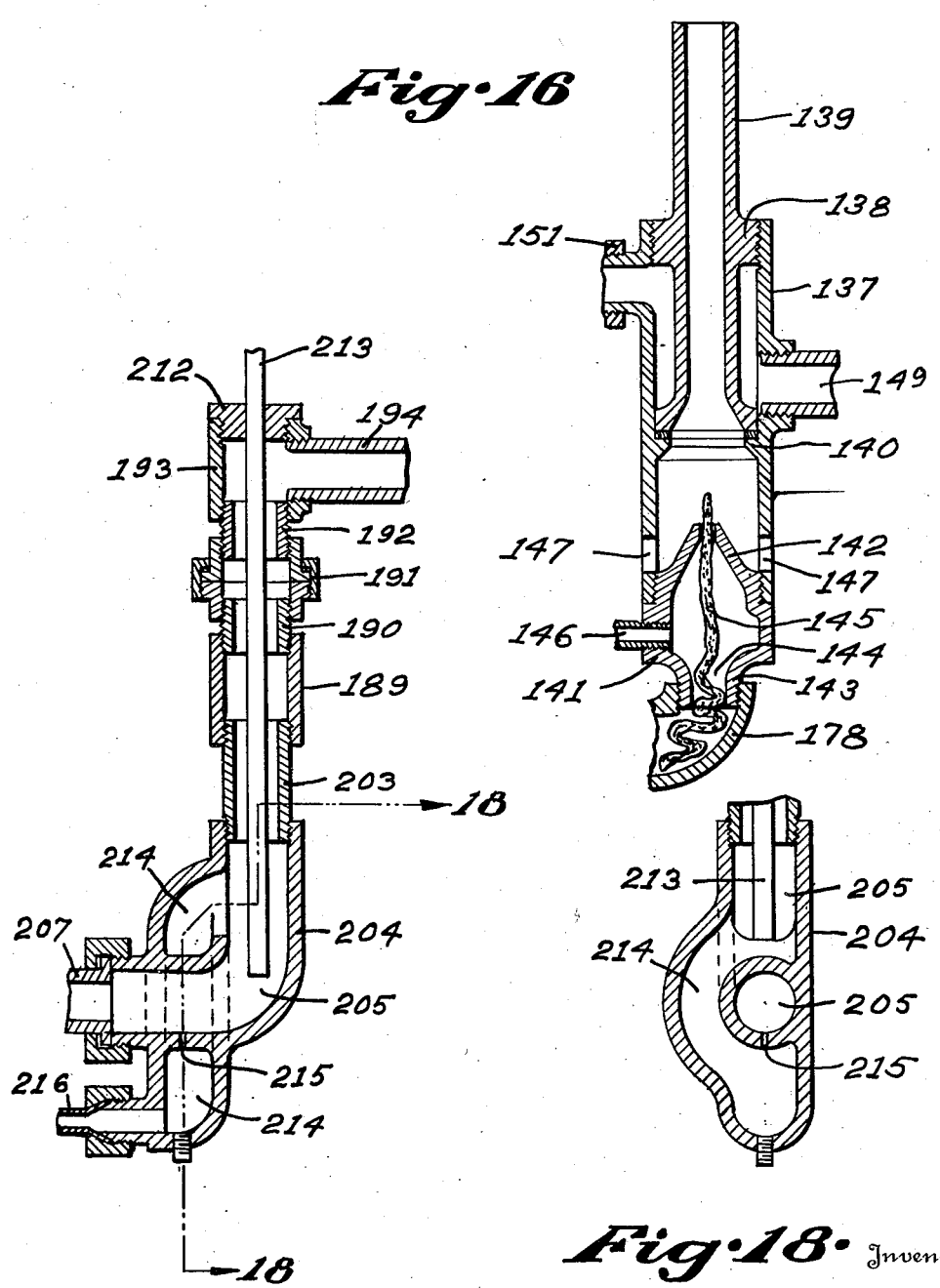

Dec. 2, 1930.   W. L. MAJORS   1,783,576
HEATING APPARATUS
Filed Nov. 30, 1925   10 Sheets-Sheet 10

Inventor:
Walter L. Majors,
By Hugh N. Wagner,
Attorney.

Patented Dec. 2, 1930

1,783,576

UNITED STATES PATENT OFFICE

WALTER L. MAJORS, OF ST. LOUIS, MISSOURI

HEATING APPARATUS

Application filed November 30, 1925. Serial No. 72,199.

This invention relates broadly to heating apparatus, and has more particular reference to an oil heater and automatic means for regulating and operating the same.

An object of the invention is to provide means to render the apparatus inoperative should the oil fail to ignite.

Another object is to provide a burner which will burn the heavier and cheaper grades of fuel oil efficiently and with a minimum of smoke and unconsumed carbon.

The cheaper grades of oil are very viscous and do not flow freely. Therefore, another object is to provide means to facilitate the flow of viscous oil from its source of supply to the burner.

Another object is to provide means for feeding the air and oil to the heater in the proportions required to produce efficient combustion.

Another object is to provide means which will regulate the rate of combustion automatically to maintain the heat within predetermined limits of temperature.

Another object is to provide remote control means for selecting the predetermined temperature limits within the range of which it is desired to confine the heater.

Another object is to provide a simple, compact, and efficient thermostat which may be included in the combustion regulating means.

Another object is to provide means for leading any overflow of oil to a convenient receiving means therefor located outside of the heater.

Another object is to provide means which operates automatically in case of overheating to prevent the further flow of oil and air to the heater until the flow is re-established by the operator or attendant.

Another object is to provide means to relieve excessive pressure in the heater automatically.

Another object is to provide convenient means for readily adjusting the apparatus to burn efficiently either light, medium or heavy grade of crude oil as may be desired.

While the invention includes the combined instrumentalities for accomplishing the aforesaid objects and other objects more or less ancillary thereto and appearing hereinafter, it is to be understood that the aforesaid means are believed to be not only combinatively novel, but certain of the devices going to make up such means are new in less combinations than the whole, and some capable of individual use, as will more clearly appear hereinafter.

In the accompanying drawings forming part of this specification, in which like numbers of reference denote like parts wherever they occur, Figure 1 is a diagram showing in a comprehensive manner the co-operation of the component parts of a preferred embodiment of this invention;

Figure 2 is a vertical central sectional view of the burner;

Figures 3, 4, and 5 are horizontal sectional views taken on the lines 3—3, 4—4, and 5—5, respectively, in Figure 2;

Figure 6 is an elevational view, partly in section, of the apparatus for supplying air, oil, and water to the burner and of the means for controlling the operation of the said apparatus;

Figure 7 is a plan view, partly sectional, of the same, showing its mode of connection to the burner;

Figure 8 is a transverse vertical sectional view taken on approximately the line 8—8 in Figure 6;

Figure 9 is a transverse vertical sectional view taken on the line 9—9 in Figure 7;

Figure 13 is a front elevation of the thermostat;

Figure 14 is a view showing details of the thermostat plunger;

Figure 15 is a longitudinal vertical sectional view taken through the heat-absorbing stem of the thermostat;

Figure 16 is a vertical central sectional view of the preliminary heater for heating and thinning the oil preparatory to passing the same through the apparatus, so that the flow of oil therethrough will be facilitated;

Figure 17 is a vertical central sectional view of the device for accumulating a charge of oil for starting purposes when the apparatus desists, taken on the line 17—17 in Figure 8;

Figure 18 is a vertical sectional view taken on the line 18—18 in Figure 17;

Figure 10:
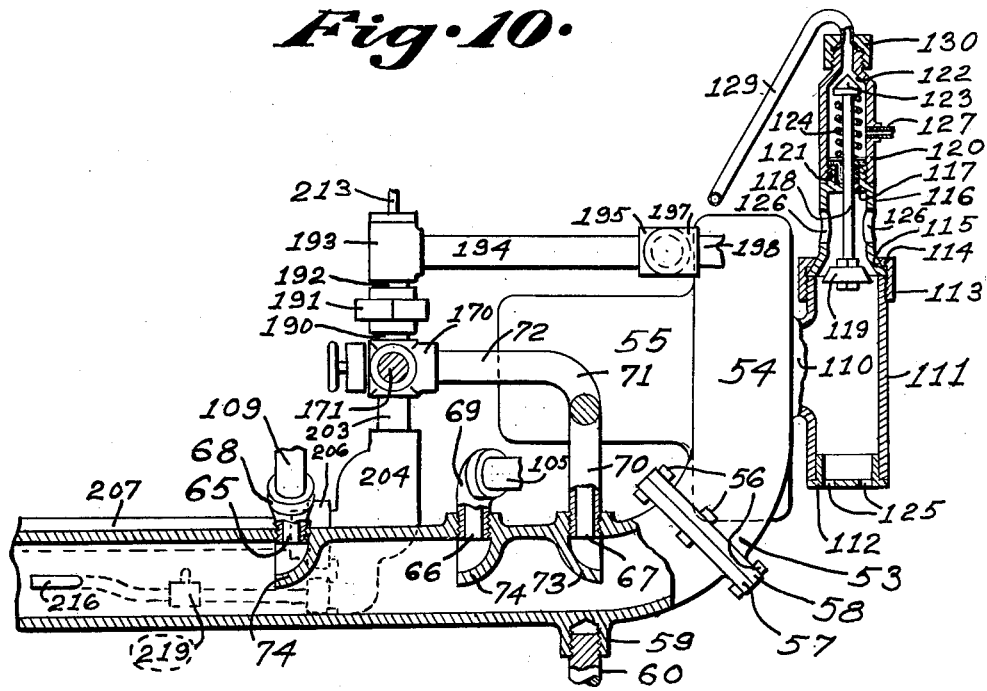
Figure 10 is a longitudinal vertical sectional view taken on approximately the line 10—10 in Figure 7.

A burner 1 is arranged inside of the firebox 2 of a furnace or boiler and comprises a bowl or basin 3, adapted to receive any overflow of oil. The basin 3, best shown in Figure 2, has a central internally screw-threaded neck 4 depending from its bottom, into which is threaded the upper of the externally threaded ends of a vertical pipe 5, the lower end thereof threading into the upper end of T-fitting 6. A vertical rod 7 has its upper end threaded into the lower end of T-fitting 6, and its lower end is adapted to slide in the vertical sleeve or hollow stem 8, being retained in fixed position therein by tightening set screw 9, screw-threading laterally into the sleeve 8. The lower end of sleeve 8 is preferably provided with a supporting flange 10, preferably screw-threaded thereon. The lateral end of T-fitting 6 receives the threaded end of an overflow pipe 11, to be hereinafter referred to. A sleeve 12 threads into the upper end of neck 4, rising from the bottom of the bowl and enlarging at its upper end into a basin 13, which is adapted to receive porous, fire-resisting material, such as asbestos 14, which will absorb a charge of oil to facilitate lighting the burner. A low annular wall 15 preferably rises from the bottom of the bowl 3 concentrically around the sleeve 12, and is preferably formed or cast integral with the bowl 3. The annular groove 16 thus formed intermediate of the wall 15 and the sleeve 12 communicates laterally at its bottom with the interior of the sleeve 12 through an opening 17 in the said sleeve. Should the oil in the bowl 3 rise higher than the top of the wall 15, it will overflow into the groove 16 and through opening 17 into pipes 5 and 11, to be disposed of in a manner hereinafter to be described. The function of the wall 15, therefore, is to retain within the cup a predetermined quantity of any overflow of oil. Bosses 18 rise from the upper edge of the bowl 3, and have internally screw-threaded recesses in their upper faces to receive the screws 19, which pass through openings in horizontal plate 20, resting on the said bosses, and so secure the said plate thereto. A marginal flange 21 rises from plate 20 and prevents oil from flowing over its edge. Holes 22 in the plate 20 over the cup 3 permit excess oil thereon to drop into the cup 3. The marginal portion of the plate 20 which overhangs the cup 3 supports bosses 23, depending from and integral with the marginal portions of a horizontal grate 24. The margin of grate 24 is disposed in horizontally retracted relation to the flange 21, so that oil overflowing from the margin of the grate falls within the confines of the said flange. Screws 25 pass through holes in plate 20 and thread into the bottom of the bosses 23, thereby securing grate 24 to plate 20. The central portion of grate 24 is solid, and a depression 26 is formed in the upper surface thereof to accumulate a portion of the oil dropped on the grate and to prevent its spreading too rapidly over the surface of the grate. The oil retained in the depression 26 is heated by the hot grate 24, thereby becoming less viscous and spreading with greater facility in a thinner layer over the grate, and a portion also of the oil may evaporate, thus promoting efficient combustion, especially of the cheaper and heavier grades of oil. A boss 27 depends centrally from the grate 24 and rests on the plate 20. A pilot burner shell 28, comprising preferably an annular wall 29 and a horizontal bottom wall 30, is secured centrally to the underside of plate 20 by means of a screw 31, passing through an opening therefor in the wall 30 and another opening in the plate 20 and threading into the bottom of the boss 27. A tube 32 passes from the front of the burner under plate 20 and through the wall 29 into the interior of the shell 28. The said tube or pipe 32 supplies either fuel gas or thin fuel oil, such as kerosene, to the shell 28, which is ignited to form a continuously burning pilot light. Openings 33 in the wall 30 permit access of air to the interior of the shell 28 and also permit excess oil to drop into the cup 13. The pilot flame issues laterally through openings 34 in wall 29 and passes upwardly through openings 22 in plate 20, igniting the oil thereon. An annular spreader 35, having an annular groove in its underside spreads the flame from the inner annular row of openings 22 thereunder. The spreader 35 fits loosely around boss 27 and is held in spaced relation from the plate 20 by suitable depending, and preferably integral, projections 36. An annular row of bosses 37 project upwardly from the grate 24 intermediately of the central and marginal portions of the grate. A horizontal flange 38, formed on the lower end of an elbow pipe fitting 39, rests on the bosses 37 and is secured thereto by means of screws 40, passing through openings therefor in the flange 38 and threading into the top of the bosses 37. The lower end of fitting 39 is disposed centrally over the depression 26, and a deflector 41, having a concave runway 42 on its upper side, is secured by means of screw 43 to the flange 38 for the purpose of directing oil, flowing from one side of the fitting, to a point directly over the center of the depression 36. The forward end of fitting 39 threads into one end 44 of the double-ended arm of a T-fitting 45. The other end 46 of said arm has threaded thereinto the discharge end of the pipe 47 supplying air and oil thereto, and, in the case of heavy oil, also water. The other arm 48 of the T-fitting projects laterally, its open end being closed by a nipple 49 and a cap 50. By reason of the internal diameter of the T-fitting 45 being greater than the internal diameter of the elbow 39 and pipe 47, a shallow recess or pocket 51 is formed between the said elbow and the said pipe in which a portion of the oil is retained to be thinned and evaporated from the heated surfaces thereof. Furthermore, the air in the arm 48 becomes highly heated, and mixing with the oil, and perhaps, also, water, evaporated from the pocket 51, forms a combustible mixture, which becomes ignited before issuing from the discharge end of the elbow 39, and then passes downwardly through the openings 52 in the grate 24, also flaring out laterally between the plate 20 and grate 24, and between the latter and the flange 38.

The outer end of pipe 47 inclines upwardly at its outer end to form a continuation of the downwardly and forwardly extended outlet duct 53 of an air blower 54, driven by an electric motor 55. The juncture of the pipe 47 and duct 53 is effected by bolts 56 passing through adjoining flanges 57 and 58 formed integral with the said pipe and duct respectively. An interiorly screw-threaded sleeve 59 depends from the underside of the pipe 47 in juxtaposition to its outer end, being preferably formed or cast integral with the said pipe. A rod or post 60 has its upper end screw-threaded to fit the screw-threaded interior of the sleeve 59. The lower end of rod 60 is slidable in a sleeve 61, having secured to its base a flange 62, which rests on the floor 63. The rod 60 is adjusted vertically in the sleeve 61 so that the pipe 47 declines slightly from the blower 54 to the burner 1, so as to facilitate the flow of oil and water therein toward the burner. The rod 60 is clamped in its adjusted position by a set screw 64, threading laterally into the sleeve 61. A longitudinal series of internally screw-threaded openings 65, 66, and 67 are formed in the upper side of the pipe 47 near its outer end. The foremost opening 65 and the intermediate opening 66 have threaded into the top thereof the elbow pipe fittings 68 and 69, respectively; and the rearmost opening 67 has threaded into its top the lower end of the vertical arm 70 of an elbow pipe 71, whose horizontal arm 72 projects forwardly, as best shown in Figure 10. A deflector 73 is disposed immediately under the opening 67 so as to direct a portion of the stream of air from the blower into the pipe 71. Deflectors 74 are disposed under the openings 65 and 66 in reverse relation to the deflectors 73 so that they tend to prevent air from the blower from passing up into the openings 65 and 66. The deflectors 73, 74, and 74 are preferably formed integral with the pipe 47. An exteriorly screw-threaded horizontal stem 75 is formed integral with and projects laterally from the pipe 71.

A T-fitting 76 is supported by the said stem and connects horizontal pipe 77 with vertical pipe 78. Vertical pipe 78 is connected through union 79 and nipple 80 centrally into the bottom of the base 81 of a container 82 and supports the same. The other end of pipe 77 is connected to one end of a three-way valve 83. The opposite end of valve 83 is connected through a nipple 84 to the lateral end of a T-fitting 85. The intermediate or third end of valve 83 is connected through nipple 86 and union 87 to the hollow base 88 of a float chamber casing 89. The level of liquid in casing 89 is maintained constant in the conventional manner. When the level of liquid rises in the float chamber, float 90 rises therewith, and, through the intermediacy of levers 91 and flanged collar 92, lowers the needle valve 93 to which the said collar is affixed, and reduces the flow of liquid to the chamber through the valve port 94. When the level of liquid falls, the opposite effect is produced. A vertical tube 95 is formed integral with the casing 89 on the exterior of its lateral wall 96, and communication between the interior of the casing and the interior of the tube is effected through a vertical series of perforations 97 in the intervening portion of the said wall. The lower end of the tube is connected through L-fitting 98, union 99 and nipple 100 to one of the opposing ends of T-fitting 85. The opposite end of the T-fitting 85 is connected to the upper portion of valve casing 101. The lower portion of valve casing 101 is connected through union 102, nipple 103, elbow 104, and pipe 105 to elbow 69. Any overflow of liquid in tube 95 and casing 89, which might occur should valve 93 fail to function or for other reasons, is carried away through the overflow conduit connected to the upper portion of casing 89 and comprising union 106, nipple 107, elbow 108, and pipe 109, which connects to elbow 68, and thus diverts the overflow to the pipe 47 and prevents spilling on the floor.

Figures 11, 12:
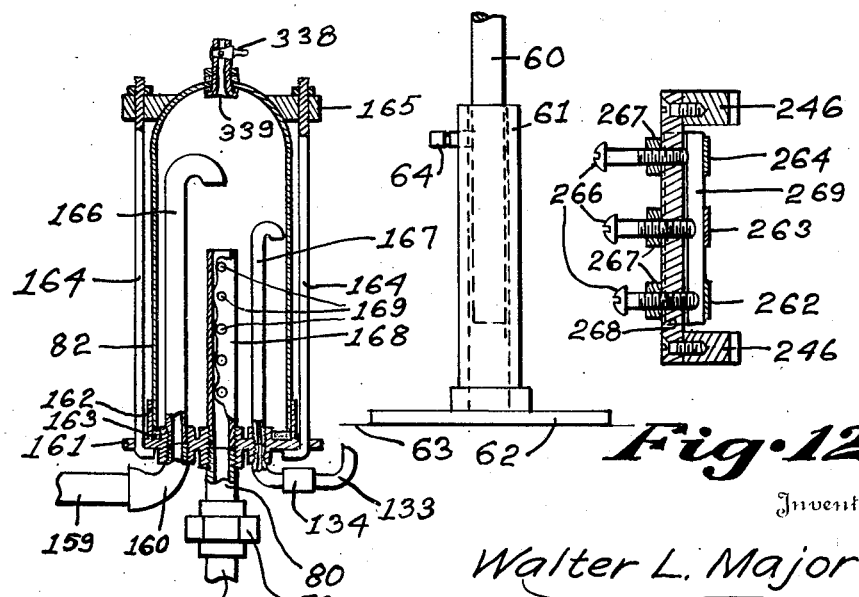
Figure 11 is a longitudinal vertical sectional view showing details of the oil and water mixing chamber.
Figure 12 is a horizontal sectional view of the temperature-selective switch, taken on the line 12—12 in Figure 13.
Figure 19:
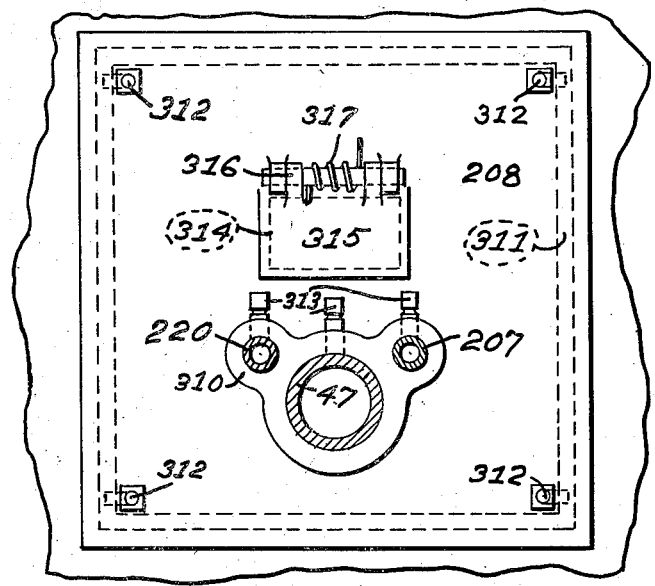
Figure 19 is a front view of the door of the heater, showing details of the apparatus associated therewith.
Figure 20:
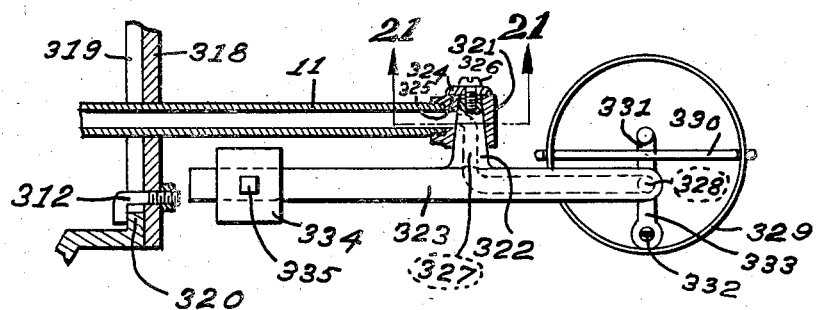
Figure 20 is a plan view, partly in section, of the overflow device which renders the apparatus inoperative if the oil fails to ignite.
Figure 21:
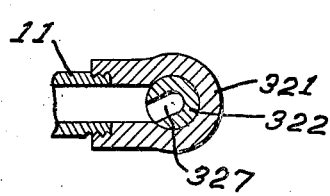
Figure 21 is a vertical transverse sectional view through the pivotal joint of the overflow conduit, taken on approximately the line 21—21 in Figure 20.

The rear end of blower 54 has a central neck 110 preferably formed integral therewith and joining the same to the middle portion of a vertical tubular casing 111, the lower end of which is preferably closed by a cap 112, preferably retained therein by friction. The upper end of casing 111 is externally screw-threaded to receive an internally screw-threaded sleeve 113, having an internally conical internal annular flange 114 at the upper end thereof. Flange 114 fits lower conical or flared portion 115 of a vertical cylindrical shell 116 and clamps the same against the upper end of casing 111. The upper end of shell 116 is closed by a transverse wall 117, having a central opening therein to accommodate vertical stem 118, having a piston 119 secured to its lower end. Piston 119 presents a conical lateral surface adapted to fit the internal side of conical portion 115 of shell 116, as shown in Figure 10. A valve casing 120 is internally screw-threaded at its lower end to fit the externally screw-threaded neck 121 projecting upwardly from the wall 117. Valve casing 120 presents a conical valve seat 122 to valve plug 123, formed on the upper end of stem 118. Plug 123 is normally pressed against seat 122 by compressed coil spring 124, and is withdrawn from the said seat against the force of said spring by the vacuum suction of the blower 54 on piston 119. The degree of suction on the piston 119 is governed by the size of openings 125 in the cap 112, through which air is admitted in its passage to the blower 54. Openings 126 in shell 116 maintain atmospheric pressure on the upper end of piston 119. A pipe 127, leading from a source 128 of water under pressure is connected into the side of valve casing 120. Another pipe 129 is connected by union 130 to the upper outlet end of valve casing 120, and leads to a three way valve 131, disposed at the rear of the base 81 of vessel 82. Valve 131 may be manipulated to lead the water from pipe 129 either into pipe 132, discharging into the upper end of tube 95, or into pipe 133, having therein a check valve 134, Fig. 11, adapted to present reversal of flow of the water therein, and leading into the bottom of base 81 of vessel 82.

At one side of the pipe 47, integral therewith and juxtaposed to the float regulator 89 is an internally screw-threaded boss 135, into which fits stem 136, projecting laterally from, and formed integral with, a cylindrical vertical casing 137, see particularly Figs. 9 and 16, internally screw-threaded at its upper end to receive an externally screw-threaded flange 138, formed laterally on a central hollow sleeve 139, flared at its lower end and bearing against a flange 140, formed on the inside of the casing 137, as shown in Figure 16. The lower end of casing 137 is screw-threaded internally to receive an externally screw-threaded plug 141. Plug 141 has a central conical protuberance 142 on its upper side, and a central vertical externally screw-threaded nipple 143 depending from its lower end; and a central passage 144 extends vertical through the entire plug. An asbestos wick 145 is disposed in the passage 144 and projects up through the protuberance 142. Coal oil supplied through a pipe 146, connected into one side of the plug 141, passes into the passage 144 and rises in the wick 145. In lieu of coal oil, gas may be supplied into passage 144 through the nipple 143 by piping connected thereto, as will hereinafter be described. The gas or coal oil burns at the tip of the burner tit 142, the combustion being supported by air admitted through openings 147, formed in the casing 137 opposite the tit 142. The products of combustion pass up through the sleeve 139 and out into the atmosphere, the heat passing through the sleeve 139 and heating fuel oil which circulates in the space intermediary of the inner sleeve 139 and the outer casing 137. The oil is supplied under pressure from any suitable source 148 through a pipe 149, connected into the side of sleeve 137 at the bottom of the said space. The heated oil rises through the space between sleeves 137 and 139 and passes out through pipe 150 connected through union 151 to the side of the sleeve 137 at its upper end. The oil passes from pipe 150 through cut-off valve 152, nipple 153, elbow 154, riser 155, elbow 156, nipple 157, check valve 158, pipe 159, and elbow 160, screwed into the bottom of base 81 of chamber 82. Check valve 158 prevents reversal of flow of the oil. The heating of the oil reduces its viscosity so that it will flow freely through the several conduits, valves, and chambers into the burner.

The flow of oil is further facilitated by mixing it with water. The water, also, contributes to a more perfect combustion of the oil. The oil and water are mixed in the chamber 82. The base 81 of said chamber (see Figure 11) comprises a metal disc 161 of larger diameter than the casing 82 and having an annular flange 162 rising therefrom and snugly fitting the exterior of the casing 82. Casing 82 is preferably formed of a glass shell terminating in a hemispherical top and having its lower end bearing on a basket 163 on the disc 161. Casing 82 is clamped against gasket 163 by means of bolts 164, passing through disc 161 and a ring 165, bearing on the hemispherical top of the shell. A vertical tube 166, having a bent-over upper end, is secured to the disc 161 so as to form a continuation of the elbow 160. A vertical tube 167, also, having a bent-over upper end, is secured to the disc 161 so as to form a continuation of the pipe 133. The oil and water discharged from the tubes 166 and 167, respectively, are forced by the pressure, resulting from the head of liquid in shell 82, into the central tube 168 through the vertical series of openings 169 in the wall of the said tube, and should the level rise higher than the open top of the tube, then, also, through the said open top. The plurality of openings 169 insures that the superposed layers of oil and water will drain simultaneously into the tube 168 through at least some of the said openings irrespective of the height of the dividing line between the layers. Tube 168 forms a continuation of nipple 80 and discharges through the said nipple and the piping connected thereto. The discharge orifice of tube 167 is disposed higher than the top of tube 168; and the discharge orifice of tube 166 is disposed higher than the discharge orifice of tube 167.

As shown in Figs. 7, 8 and 10 the forward end of arm 72 of elbow 71 has connected thereto a valve 170 having opposing internally screw-threaded openings in the right and left sides thereof. The opening in the left side of the valve 170 is closed by an externally screw-threaded plug 171, whose outer end screws into the lateral arm of a T-fitting 172. The lower end of the vertical arm of T-fitting 172 is connected to depending pipe 173, the other end of which is connected through the intervention of elbow 174, nipple 175, union 176, nipple 177, and elbow 178 to nipple 143, see Fig. 16. The upper end of T-fitting 172 is connected through nipple 179, union 180, nipple 181, elbow 182, horizontal pipe 183, valve 184, nipple 185 and T-fitting 186 to a pipe 187 leading from a suitable source of combustible gas, such as coal gas.

The opening in the right side of valve 170 is connected through nipple 188 to the lateral arm of T-fitting 189. The upper end of fitting 189 is connected through nipple 190, union 191, and nipple 192 into the lower end of T-fitting 193, the rear arm of which is connected through pipe 194, elbow 195, nipple 196, elbow 197, nipple 198, valve 199, nipple 200, elbow 201, and nipple 202 to the lateral arm of T-fitting 186, thus supplying gas, also, to the T-fitting 189 and the piping leading therefrom and about to be described. The lower end of T-fitting 189 is connected through nipple 203 to the upper end of a casing 204, as shown in Figures 17 and 18. The casing 204 is partitioned to form a duct 205 therein leading vertically downward from the nipple 203 and then horizontally forward to an opening in the forward end of the casing 204, where the duct is connected through union 206 to a pipe 207, leading through the closure plate 208, on the front wall of the furnace, to elbow 209, connected through depending pipe 210 and elbow 211 to pilot pipe 32. The upper end of T-fitting 193 is closed by a cap 212 screw-threaded therein. A pipe 213, leading from a source of coal oil, is soldered or otherwise secured to the cap 212 and passes through a central opening therein to a point near the lower end of the vertical portion of duct 205. A second duct 214 is formed in the casing 204, and at its upper end opens laterally into the upper portion of the duct 205. Duct 214 passes down and around the walls of the horizontal portion of duct 205 to a point directly thereunder. A small opening 215 in the bottom wall of the horizontal portion of duct 205 permits a minor portion of coal oil passing therethrough to trickle into the bottom of duct 214. A pipe 216 is connected through union 217 to the forward side of duct 214 under the pipe 207. Pipe 216 extends forwardly and then obliquely inward through the wall of pipe 47, discharging into the pipe 47 at a level slightly higher than the level of its forwardly extended exterior portion, forming a pocket in which a small charge of coal oil may accumulate when the air pressure therein produced by the blower 54 desists. A valve 218 controls the flow of oil through pipe 213; and a valve 219 is provided in pipe 216 to prevent the flow of gas therethrough in the event that gas instead of coal oil is passed through the pipe 207 to the pilot burner.

The thermostat employed to control the operation of the heater is best shown in Figures 6, 7, 13, 14, and 15, and comprises a horizontal tube 220, passing through an opening therefor in the closure plate 208, and extending interiorly and exteriorly of the furnace. The inner end is closed by a cap 221, screw-threaded thereon. A T-fitting 222 is screwed on the outer end of tube 220; and the opposite end of the said fitting is connected through nipple 223 with T-fitting 224, the opposite end of which is connected to the externally threaded hollow stem 225 of the lower end elbow 226 of a glass gauge 227, which may be of the usual type. The inserted end of stem 225 is, also, internally screw-threaded to fit the externally screw-threaded outer end of a tube 228, having its inner end open and extended within the tube 220 almost to the cap 221. A reservoir 229 for holding water terminates at the top and bottom in externally screw-threaded hollow necks 230 and 231, respectively. The lower neck 231 fits the upwardly projected arm of T-fitting 224, and the upper neck 230 is screw-threaded into the lower end of T-fitting 232, the upper end of which is closed by a plug 233, which may be removed for the purpose of filling the thermostat with water. Horizontal arm 234 of upper elbow 235 of glass gauge 227 is screw-threaded into the lateral arm of T-fitting 232. The lateral arm of T-fitting 222 declines toward the left and is connected through elbow 236, nipple 237, and elbow 238 to an internally screw-threaded opening in the bottom of a second reservoir 239, the upper end of which develops into a vertical cylinder or tube 240. The lower portion of tube 240 is threaded internally to receive a plug 241, which has a convex upper end adapted to enter and spread or flare the lower end of a corrugated expansible tube 242, and make a fluid-tight joint of the flared end with the concave inner side of an annular flange 243 formed on the inner side of tube 240 immediately above the said internal threads. Tube 242 is preferably formed of copper or other comparatively easily yieldable or flexible metal, its upper end being closed. A tube or hollow piston 244, closed at its upper end and open at its lower end, is adapted to slide within the outer tube 240 and to cover the expansible tube 242. Tubes 220 and 228, gauge 227, elbows 226 and 235, T-fittings 222, 224, 232, nipple 223, and reservoir 229 form a system through which the water circulates when being heated. The water is heated in tube 220, projected into the interior of the furnace; and the heated water, when it passes into those portions of the circulating system disposed exteriorly of the furnace, imparts its heat to the surrounding air and objects, thus becoming cool again. Since the warmer water always rises, and the colder water falls, it is manifest that the elbow 236, nipple 237, and elbow 238 form a trap which prevents hot water passing therethrough into the reservoir 239. Were the reservoir 239 a part of the circulating system, steam might possibly be generated therein at sufficient pressure to escape through the juncture of the tube 242 and the flange 243, whereas ordinarily any leakage at that point would be prevented. The joints throughout the thermostat are preferably made fluid-tight, so that no leakage of water may occur. Any other suitable circulating medium may, of course, be used as a substitute for the water. When that portion of the thermostat within the furnace absorbs more heat than is radiated by that portion of the thermostat disposed exteriorly of the furnace, expansion of the water ensues, and the piston 244 is forced upwardly. When the condition is reversed, the piston falls. The comparatively large volume of water held in the reservoirs 229 and 239 renders the device non-responsive to mere momentary temperature changes which might occur in the firebox and which are of too short a duration to be perceptible exteriorly of the furnace and in the space heated thereby. A forwardly projecting arm 245 is formed integral with the upper portion of tube 240, and extends laterally and upwardly on each side at its forward end to form a U-shaped member having a pair of vertical arms 246. A lever 247 is pivoted at 248 to the lower portions of each of said arms and intermediate of the same. Lever 247 comprises a forwardly and upwardly extended or L-shaped arm 249, and a rearwardly extended arm 250, bifurcated at its outer end into an upper branch 251 and a lower branch 252. The middle portion of arm 250 bears on the upper end of piston 244, being maintained thereagainst by a contractile spring 253, the lower end of which is connected to a lug 254, formed on the rear upper portion of the container 239, and the upper end of which is connected to the lower branch arm 252. A normally vertical lever 255 is pivoted at its lower end 256 to a lug 257 formed on the rear side of the vessel 239. A sleeve 258 is slidable over the lever 255 and may be secured in any desired position thereon by tightening set screw 259, threaded therethrough and adapted to bear on the lever 255. A lateral projection 260 is formed on the right side of sleeve 258. Lever 255 is normally retained in its upright position by reason of the engagement of the depending portion of branch arm 251 with the rear side thereof. An insulating plate 261 is secured at each lateral end to the upper portions of arms 246. Blades or prongs 262, 263, and 264 of resilient electrically conducting material, preferably vertically disposed strips of bronze or brass, are secured at their upper ends by means of metal bolts 265 to the upper portion of plate 261. Screws 266 are threaded through the lower portion of plate 261 and are secured against displacement by lock nuts 267. Each of the screws 266 bears against the middle portion of a respective one of the blades 262, 263, and 264. An insulating plate 268 is secured to the arm 249 directly under and parallel to the plate 261. An electrically conducting plate 269, preferably of carbon or non-arcing or non-oxidizable metal is secured to the rear side of plate 268. The screws 266 are so adjusted that the lower ends of blades 262, 263, and 264 all bear on the plate 269 when the piston 244 of the thermostat is at the lower end of its stroke. The screws 266 are further so adjusted that, as piston 244 rises and plate 269 moves forward, the plate 269 moves out of contact with each of said blades in succession. For the purpose of illustration, the respective screws 266 may be so adjusted that blade 262 first breaks connection with plate 267, and, as piston 244 continues to rise, middle blade 263 and then blade 264 break connection with plate 269. Should piston 244 rise still further as the temperature of the thermostat rises, arm 251 moves out of engagement with projection 260, and, with still further elevation of piston 244, arm 252 engages projection 260 and impels lever 255 to tilt rearwardly, the momentum of the lever 255 and its condition of unstable equilibrium thus acquired causing it to continue its rearward and downward movement after the initial impulsion received from arm 252 desists. In its downward swing, the outer end of lever 255 strikes against anti-friction roller 270, journaled on the outer end of arm 271, affixed to rotary operating stem 272 of valve 152, thereby lowering arm 271 and closing valve 152, which is open when arm 271 occupies the position shown in Figure 6. Arm 271 may be extended rearwardly beyond the stem 272 to form an arm 273. Arm 273 has secured to its underside an insulating block 274, to which is secured metal or carbon electrode plate 275. An insulating block 276 is secured by set screw 277 to pipe 150. A pair of resilient metallic strips 278 and 279, respectively, are secured by means of screws 280 to the inner side of the block 276 and project outwardly below the said block and upwardly into resilient contact with plate 275, when the said plate and the arms 271 and 273 are in the position shown in Figure 6. It is manifest that when arm 271 falls and closes valve 152, arm 273 rises and plate 275 becomes disengaged from electrode strips 278 and 279, thereby breaking an electric circuit which is normally completed across the said strips by the plate 275. Projection 260, borne by sleeve 258, may be adjusted vertically, by reason of the slidability of said sleeve on the lever 255, so that the lever 255 may be tripped or actuated at a desired instant, sooner or later, during the upward stroke of the piston 244.

Valve 101, normally closed by a compressed coil spring 281, may be opened to a greater or lesser degree, as determined by the strength of an electric current flowing through the electro-magnet 282, which opposes the force of the spring 281 by reason of its attraction for the armature 283, secured to the operating stem 284 of valve 101. The upper end of magnet 282 is secured to the horizontal upper arm of L-shaped bracket 285, whose lower end is secured to the inner side of the casing of valve 101. Magnet 282 and electric motor 55 are energized by an electric circuit 286, controlled by a main switch 287, rheostat 288, and the circuit breaking plate 275, operated automatically by the thermostat. The rheostat 288 may be of the resistance type suitable for both direct and alternating current, or, if the circuit be intended for alternating current only, the rheostat may be of the reactance type. Rheostat 288 Figs. 6 and 7, is preferably mounted on a base 289, having a forwardly projecting stem 290, screw-threaded into the rear side of the three-way valve 83, Fig. 9. Motor 55 and magnet 282 are included in branch circuits 291 and 292, respectively; and each branch circuit is in series with series-connected switch 287, rheostat 288, and circuit-breaking plate 275. A thermostat circuit 293 is, also, connected in series with either of the branch circuits 291 and 292 and the switch 287, rheostat 288, and plate 275. The thermostat circuit 293 preferably has one terminal point 294 which forms the junction of the respective leads 295 and 296 of one side of each of the circuits 291 and 292. The point 294 and the other terminal point 297 of the circuit 293 preferably form alternative contacts for a s' .ch arm 298, connected to the end of lead 295. The thermostat circuit 293 comprises lead 299, connecting contact 294 to plate 269; a switch 300, which may be placed in any convenient and readily accessible part of the building to be heated by the apparatus, and comprising switch arm 301, and alternative contacts therefor 302, 303, 304, and 305; leads 306, 307, and 308, connecting contacts 304, 303, and 302 to blades 262, 263, and 264, respectively; and lead 309, connecting switch arm 301 to contact 297. Contacts 302, 303, and 304 correspond to different desired temperatures, and may have suitable indicia thereon or associated therewith (not shown) for designating the different temperature settings. Arm 301 is engaged with contact 305 when no heat whatever is desired, it breaking the magnet circuit and cutting off the supply of oil to the heater through the valve 101.

Pipes 47, 207, and 220 pass through openings in boss 310 formed integral with plate 208, secured to door frame 311 by means of L-shaped bolts 312, passing through openings therefor in the said plate, and clamping against the inner side of the said door frame 311. Set screws 313, threading laterally through the boss 310, bear against the respective pipes therein and secure the same in place. An opening 314 is formed in the plate 208 to permit access to the interior of the furnace for the purposes of inspection and for lighting the pilot light. Opening 314 is closed by a door 315, pivoted at 316 to the plate 208, and normally maintained in closed position by torsional spring 317. The door 315, also, serves as a safety valve to release gases momentarily confined in the heater under excessive pressure as the result of an explosion or other causes.

Overflow pipe 11 preferably passes through an opening therefor in a plate 318, closing an opening 319 in the lower front portion of the wall of the furnace. The plate 318 is preferably, also, secured to the marginal frame 320 of the opening 319 by means of bolts 312. The outer end of pipe 11 terminates in a fitting 321, having a horizontally and transversely disposed conical opening therethrough, in which fits conical plug or stem 322, projecting laterally from, and preferably formed integral with, an intermediate portion of a lever 323. A washer 324 turns with stem 322, and is interposed between the end face 325 of fitting 321 and the screw 326, threaded into the end of stem 322. Screw 326 is adjusted to form a freely pivotal, yet fluid-tight, joint of plug 322 in fitting 321. The overflow of oil passes through pipe 11 into a duct 327, opening laterally in stem 322 into pipe 11, and continuing centrally through stem 322 and the outer arm of lever 323 and discharging downwardly at 328 into a bucket or other suitable receptacle 329, which may be disposed immediately under the discharge orifice 328 by hanging its handle 330 on a projection or hook 331, projecting laterally from the arm 322 in juxtaposition to the discharge end of the said arm. A chain or other flexible connection 332 is secured at one end to arm 271 and at its other end to a projection 333, formed on the other side of the arm 322 adjacent the said discharge end. The weight of the bucket 329 is balanced by a weight 334, adjustable along the length of the inner arm of the lever 323, and preferably fixed in position thereon by set screw 335. The weight 334 is adjusted so that the lever 323 is substantially horizontal when the bucket is empty. When oil overflows through pipe 11 and discharges into bucket 329 until a sufficient quantity has accumulated therein to overcome friction and the counterweight 334, the lever 323 turns on its pivot and the bucket descends, producing tension on chain 332 and overcoming the friction of valve stem 272 in turning the arm 271 downward to the shut-off position.

The complete apparatus having now been described in detail, its operation will be readily understood. Assuming that a cheap grade of heavy viscous oil is to be used as fuel, and that gas is to be used for the pilot light and for heating the oil in the casing or preliminary heater 137, the operation is as follows: The door 315, at the front of the furnace, is opened, and oil-soaked waste is ignited and introduced therethrough into the bowl 13 of the burner. Valves 170, 218, and 219 and valve 336 are closed; and valves 199, 184, and 152 are open. Three way-valves 83 and 131 are turned to the positions shown in Figure 1. Meanwhile, the gas now passing through pipe 32 and into pilot burner 29 becomes ignited from the burning oil-soaked waste disposed immediately under the burner 29, forming a continuously burning pilot light. The gas now issuing from tip 142 in preliminary-heater 137 is lighted; and thermostat arm 255 is raised to its upright position, as shown in Figures 1 and 6. Switch arm 298 is engaged with contact stud 297, thus shorting the motor 55 around the thermostat circuit 293, so that motor 55 may operate continuously irrespective of the thermostat unless the safety switch 275 is opened by the thermostat. Line switch 287 is then closed to make connection to the line 337, supplying current from any suitable source of electrical energy. Arm 301 is placed on that one of the alternative contact studs 302, 303, and 304 which corresponds to that temperature to which it is desirable to have the building heated. Blower 54 is, of course, now being operated by motor 55, and is supplying air to the burner through pipe 47. Electromagnet 282 is, also, energized, and opens valve 101, permitting oil and water to pass therethrough from the float chamber 89 into the pipe 47. Valve 93 opens sufficiently to admit liquid from mixing chamber 82 at such a rate as will maintain a constant head in float chamber 89. Air is, of course, entrapped in the upper portion of vessel 82 and prevents the liquid therein from completely filling the same. The level of liquid in vessel 82 may be regulated by permitting the proper portion of the entrapped air to escape through a valve 338, Fig. 11, preferably fitted in an opening 339 in the top of shell 82. The level of liquid preferably does not rise higher than the top of tube 168, so that the discharge of oil and water from the respective tubes 166 and 167 may be readily observed through the glass shell 82. The fuel oil is received under pressure from a source 148 and passes through pipe 149, heater 137, valves 152 and 158, and tube 166 into the chamber 82. The operation of blower 54, also, produces suction pressure on piston 119 and so opens valve 123, permitting water to flow therethrough from a suitable source 128, preferably adapted to supply the water thereto under a constant head. The water passes from valve 123 through pipe 129, three-way valve 131, pipe 133, and tube 167 into chamber 82. The supply of air, oil, and water passes through pipe 47 to the burner, where the oil is ignited by the continuously burning pilot light. The rheostat 288 is adjusted to accommodate the speed of the blower 54 and the opening of valve 101 to the needs of the system for supplying the air, water, and oil in the manner best adapted to the particular make and size of furnace and grade of oil used therein. Manifestly, less oil, water, and air need be supplied to a small furnace than to a larger one. For the purpose of illustration, arm 301 of temperature selecting device 300 has been connected to contact stud 303, which, say, corresponds to a temperature setting of seventy Fahrenheit degrees. Studs 302 and 304 may correspond to temperatures of eighty and sixty Fahrenheit degrees, respectively. When the furnace has become hot enough to heat the building to approximately an average of sixty Fahrenheat degrees, thermostat plunger 244 will have ascended far enough to disengage plate 269 from blade 262; but, as lead 306 was not in circuit, no break in the thermostat circuit 293 results. However, as the furnace becomes still hotter, and the temperature of the building approximates an average of seventy Fahrenheit degrees, the further rise of plunger 244 will have resulted in the disengagement of plate 269 from blade 263, thus breaking the thermostat circuit and de-energizing magnet 282, thereby closing valve 101, and discontinuing the supply of oil and water therethrough to the burner. When the temperature falls, plunger 244 descends, plate 269 re-engages blade 263, and the circuit is re-established, so that magnet 282 is again energized and opens valve 101 to feed more fuel to the burner, so that the temperature may rise again. The continued engagement of plate 269 with blade 264 is immaterial, since lead 308 is not in circuit during the illustrated temperature setting of the switch 300. However, should the rise of plunger 244 fail to check the flow of oil at the predetermined temperature, because of defective functioning of the apparatus or for other reasons, the continued ascension of plunger 244 will eventually result in the tripping of lever 255, causing the same to operate lever 271, thereby closing valve 152 and breaking the main circuit at the plate 275, with resultant cessation of the blower 54 and of the supply of oil and water to the burner. When the defective functioning has been corrected, the operation of the apparatus may be resumed by manually raising lever 271, which will be retained in its raised position by reason of the friction of stem 272 in the valve casing 152 being sufficient to overcome the weight of the lever 271 and the slight pressure of the slender blades 278 and 279 on the plate 275. Should the oil supplied to the burner fail to ignite, it will overflow into the basin 3 and pass through pipes 5 and 11 and duct 327 into the bucket 329, thereby tilting lever 323 and operating lever 271 through the intermediacy of chain 332, thereby rendering the motor inoperative and shutting off the supply of oil to the burner.

Should lighter fuel oil be used, switch arm 298 is preferably engaged with stud 294, so that the motor 55 ceases to operate simultaneously with the de-energization of the magnet 282, thereby saving power. For heavy oil, however, it is desirable to keep the blower running, since the heavy oil is very viscous and moves more slowly through the apparatus, so that oil on its way to the burner continues to flow into the same for some time after the valve 101 is closed, and the stream of air from the blower 54 is manifestly needed to effect the efficient combustion of the delayed oil. Furthermore, the stream of air through pipe 47 hastens the flow of delayed oil to the burner. The water supplied to the burner forms a layer in the pipe 47 on which to carry the heavy and normally slowly-moving oil, thus facilitating its flow. Moreover, the water makes for more perfect combustion, splitting up the oil into its component elements in the burner. For very light oil no water need be used. Neither need water be used for heavy oils if the stream of air to the burner be sufficiently increased; but the use of water permits the use of a blower of smaller capacity and saves power and reduces the initial cost of the apparatus besides economizing space. When the use of water is unnecessary, cap 112 is removed from the lower end of air-intake tube 111 to facilitate the flow of air thereinto. Three-way valve 83 enables the bypassing of the oil and water from chamber 82 around the float chamber 89; and three-way valve 131 permits the water from valve 123 to be shunted around chambers 82 and 89. Such shunting may be desirable at times because of defective operation of the parts of the apparatus, or for divers other reasons.

Should coal oil be used to supply fuel to the pilot light and to the preliminary heater 137, the gas valves 184 and 199 are closed; and oil supply valves 218 and 336, air valve 170, and valve 219 are opened. A small portion of the oil on its way to the pilot light drips through the opening 215 in its passage through the horizontal portion of duct 205. While the blower is in operation, the stream of air supplied therefrom through valve 170 and casing 204 to tube 216 forces the oil through the shallow pocket in tube 216 and into pipe 47. When, however, the blower desists, a charge of coal oil accumulates in the said pocket, and is available to facilitate the starting of the burner when the operation of the apparatus is resumed, the thin coal oil flowing more rapidly thereto and burning more readily than the fuel oil supplied through the pipe 47.

The corrugated shell 242 of the thermostat may, of course, be omitted, and the piston 244 may be made solid and suitable packing may be arranged intermediary of the solid piston and the cylinder 240 to effect a fairly tight joint therebetween, but the joint can not be made as fluid-tight as that between the shell 242 and flange 243 of the cylinder 240.

The burner 1, as shown in Figure 2, may also be modified by omitting the screws 40 and bosses 37 connecting flange 38 and grate 24. Figure 1 illustrates this modification, which permits the space between the flange 38 and the grate 24 to be adjusted to suit the particular type of furnace in which it is used and the grade of oil employed therein.

It will be observed that the particular arrangement and space relation of the various pipes and parts results in a very compact device occupying a minimum of space. Also, valves 184, 199, 131, and 83 and rheostat 288 are all conveniently accessible from the rear end of the apparatus. The preliminary heater 137 is also disposed substantially centrally of the feeding apparatus, thereby heating not only the oil as it passes therethrough, but, also, those parts of the apparatus surrounding the heater, so that the oil does not again become chilled and thickened after leaving the heater.

Having thus fully described this inven- tion, I hereby reserve the benefit of all changes in form, arrangement, order, or use of parts, as it is evident that many minor changes may be made therein without departing from the spirit of this invention or the scope of the following claims.

I claim:

1. A heater having a cup-shaped burner, a conduit leading from an oil supply to said burner, means operated by the overflow of oil from the burner for controlling the flow of oil to the burner, a subsidiary mixture supply means comprising a main air feed provided with a subsidiary fuel feed for discharging component parts of the fuel into the main air feed and means for automatically controlling the fuel discharge.

2. A heater having a burner, a conduit leading from an oil supply to said burner, means for regulating the flow of oil to said burner under control of the overflowing oil therefrom and a subsidiary mixture supply means including a main air feed provided with a subsidiary fuel feed for discharging component parts of the fuel into the main air feed.

In testimony whereof I hereunto affix my signature.

WALTER L. MAJORS.